(12) United States Patent
Steinlage et al.

(10) Patent No.: US 10,743,457 B2
(45) Date of Patent: *Aug. 18, 2020

(54) HINGE SYSTEM

(71) Applicant: Deere & Company, Moline, IL (US)

(72) Inventors: David L. Steinlage, Centralia, KS (US); Jeremy Nefzger, Ankeny, IA (US); Shawn J. Becker, Centralia, KS (US)

(73) Assignee: DEERE & COMPANY, Moline, IL (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/988,072

(22) Filed: May 24, 2018

(65) Prior Publication Data

US 2018/0263168 A1    Sep. 20, 2018

Related U.S. Application Data

(63) Continuation of application No. 15/239,339, filed on Aug. 17, 2016, now Pat. No. 10,004,172.

(60) Provisional application No. 62/214,326, filed on Sep. 4, 2015.

(51) Int. Cl.
    *A01B 73/04*    (2006.01)
    *A01B 73/02*    (2006.01)

(52) U.S. Cl.
    CPC ............ *A01B 73/044* (2013.01); *A01B 73/02* (2013.01)

(58) Field of Classification Search
    CPC ...... A01B 73/044; A01B 73/02; Y10T 16/553
See application file for complete search history.

(56) References Cited

U.S. PATENT DOCUMENTS

| 1,109,074 | A | * | 9/1914 | Lannon | B61F 15/26 |
|---|---|---|---|---|---|
| | | | | | 384/190.6 |
| 3,314,386 | A | | 4/1967 | Kopaska | |
| 3,505,704 | A | | 4/1970 | Hornung et al. | |
| 3,972,090 | A | * | 8/1976 | Holmes | E05D 11/1014 |
| | | | | | 16/321 |
| 4,074,766 | A | | 2/1978 | Orthman | |
| 4,105,077 | A | | 8/1978 | Seifert, Jr. | |
| 4,355,689 | A | | 10/1982 | Friggstad | |
| 4,619,330 | A | | 10/1986 | Machnee | |

(Continued)

OTHER PUBLICATIONS

EP161867916 Extended European Search Report dated Feb. 13, 2017 (5 pages).

*Primary Examiner* — Tara Mayo-Pinnock
(74) *Attorney, Agent, or Firm* — Michael Best & Friedrich LLP

(57) ABSTRACT

A hinge for an agricultural machine having a center section having a first aperture, a wheel supporting the center section, a wing section connected to the center section and having a second aperture, and a hinge positioned between the center section and the wing section to permit the wing section to pivot about the center section. The hinge includes a pin which extends through the first and second apertures to connect the wing section to the center section. A first fastener engages the center section or the wing section and is adjacent to the first end of the pin to thereby retain the pin in the first and second apertures. A second fastener engages the center section or the wing section and is adjacent to the second end of the pin to thereby retain the pin in the first and second apertures.

20 Claims, 9 Drawing Sheets

(56) References Cited

U.S. PATENT DOCUMENTS

| | | | |
|---|---|---|---|
| 4,790,047 A * | 12/1988 | Myslicki | ............... E05D 5/10 |
| | | | 16/273 |
| 5,577,858 A | 11/1996 | Kasim et al. | |
| 6,568,649 B1 | 5/2003 | Schmitt | |
| 6,758,486 B1 | 7/2004 | Kollath | |
| 2006/0065413 A1 | 3/2006 | Hoehn et al. | |
| 2014/0034341 A1 | 2/2014 | Fast | |
| 2015/0334915 A1 | 11/2015 | Mead et al. | |

* cited by examiner

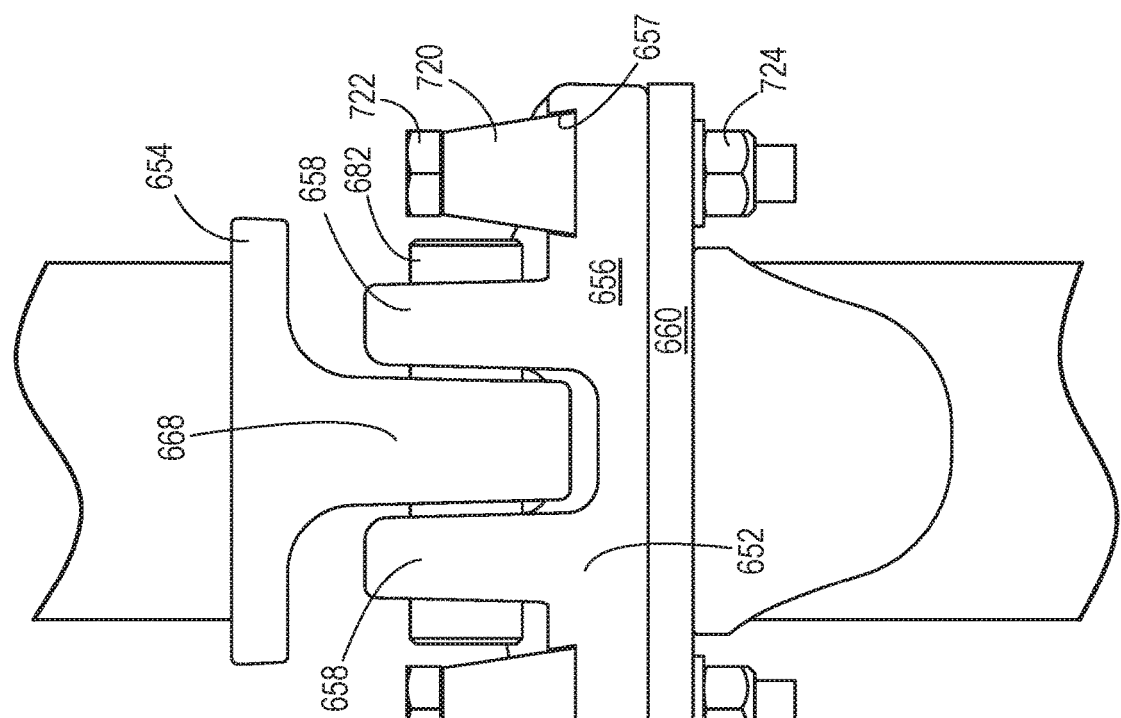
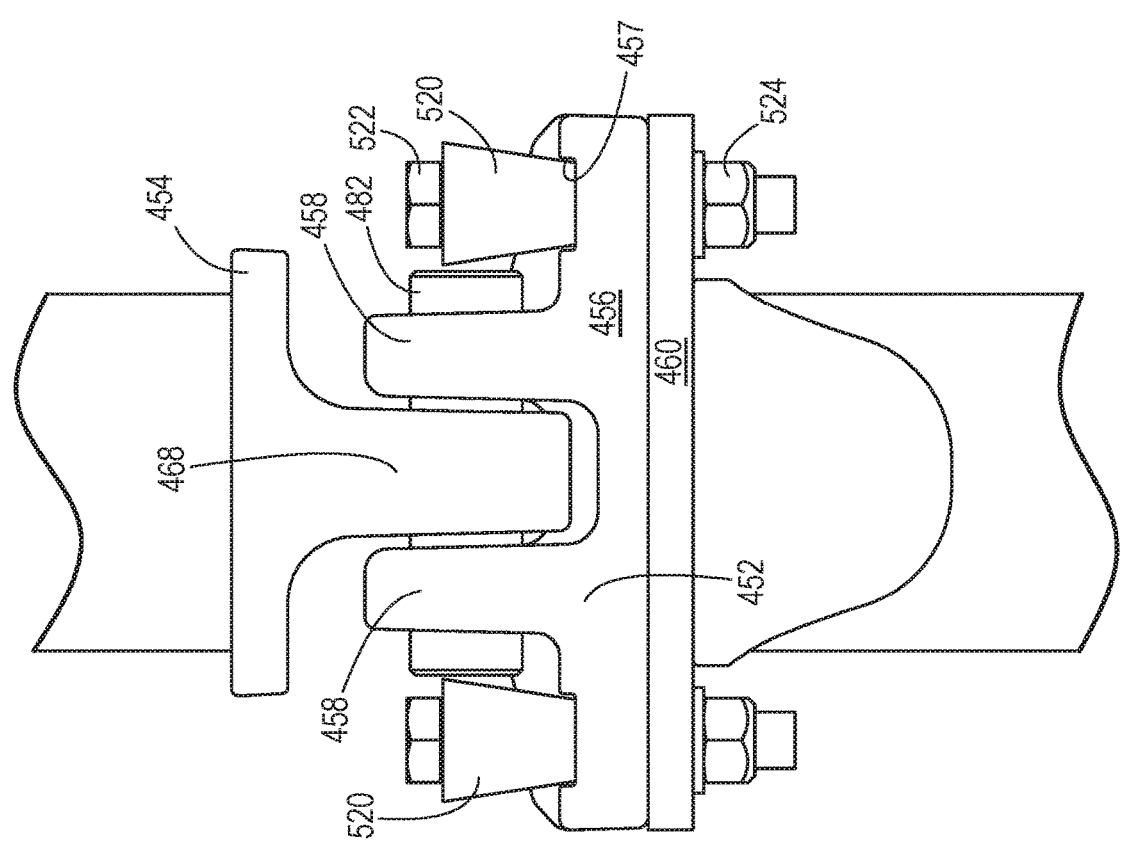

HINGE SYSTEM

CROSS REFERENCE TO RELATED APPLICATIONS

This application is a continuation of U.S. application Ser. No. 15/239,339 filed Aug. 17, 2016 which claims priority to U.S. Application No. 62/214,326 filed Sep. 4, 2015.

FIELD OF THE DISCLOSURE

This disclosure relates generally to pivoting pins and hinges.

BACKGROUND OF THE DISCLOSURE

Agricultural implements and machines, including various cultivators, plows, tillers, rippers, seeders, nutrient applicators, etc., are used to work the soil of crop fields. These two to five thousand pound implements and machines are often towed behind tractors. Tillage and other agricultural implements in particular perform a variety of tasks, such as breaking up tough ground, turning the soil, and eradicating weeds. Traveling at 10 to 15 mph, the impact of portions of these implements or machines with the ground generates large forces on certain components (e.g. hinges, flanges, shanks, disks, gangs, and electronics).

SUMMARY OF THE DISCLOSURE

Various aspects of example embodiments are set out below and in the claims. Embodiments include hinges or pivotal joints that are buttressed by bolts or bushings so that the hinge pin does not fall out. Other embodiments are disclosed in the detailed description, accompanying drawings and claims.

Some embodiments include an agricultural machine having a center section, a wheel supporting the center section, a wing section coupled to the center section, and a hinge positioned between the center section and the wing section. The hinge permits the wing section to pivot about the center section. The hinge includes a first part having a first protrusion defining a first aperture, the first part is connected to the center section, a second part having a second protrusion, the second protrusion defining a second aperture, the second part is coupled to the wing section, and a pin having a first end and a second end. The pin extends through the first and second apertures to connect the first part and the second part such that the wing section can be pivoted with respect to the center section. A first fastener is positioned adjacent the first end of the pin. The first fastener is operable to couple the first part to the center section and to abut the first end of the pin to thereby retain the pin in the first and second apertures. A second fastener is positioned adjacent the second end of the pin. The second fastener operable to couple the first part to the center section and to abut the second end of the pin to thereby retain the pin in the first and second apertures.

Some embodiments include a hinge for an agricultural machine having a center section, a wheel supporting the center section, a wing section connected to the center section, and a hinge positioned between the center section and the wing section. The hinge permits the wing section to pivot about the center section. The hinge includes a first part having a first protrusion and defining a first aperture, the first part is connected to the center section, a second part having a second protrusion and defining a second aperture, the second part is connected to the wing section, and a pin having a first end and a second end. The pin extends through the first and second apertures to connect the first part and the second part such that the wing section can pivot with respect to the center section. A first fastener is adjacent to the first end of the pin. The first fastener connects the second part to the wing section and abuts the first end of the pin to thereby retain the pin in the first and second apertures. A second fastener is adjacent to the second end of the pin. The second fastener connects the second part to the wing section and abuts the second end of the pin to thereby retain the pin in the first and second apertures.

Some embodiments include an agricultural machine that has a center section having a first aperture, a wheel supporting the center section, a wing section connected to the center section and having a second aperture, and a hinge positioned between the center section and the wing section to permit the wing section to pivot about the center section. The hinge includes a pin having a first end and a second end. The pin extends through the first and second apertures to connect the wing section to the center section. A first fastener engages the center section or the wing section and is adjacent to the first end of the pin to thereby retain the pin in the first and second apertures. A second fastener engages the center section or the wing section and is adjacent to the second end of the pin to thereby retain the pin in the first and second apertures.

BRIEF DESCRIPTION OF THE DRAWINGS

The Detailed Description refers to the following example figures:

FIG. 9A is a side view of another example sunken buttress.

FIG. 9B is a side view of another example sunken buttress that is interlocked to an example hinge plate.

DETAILED DESCRIPTION

Figure 1:
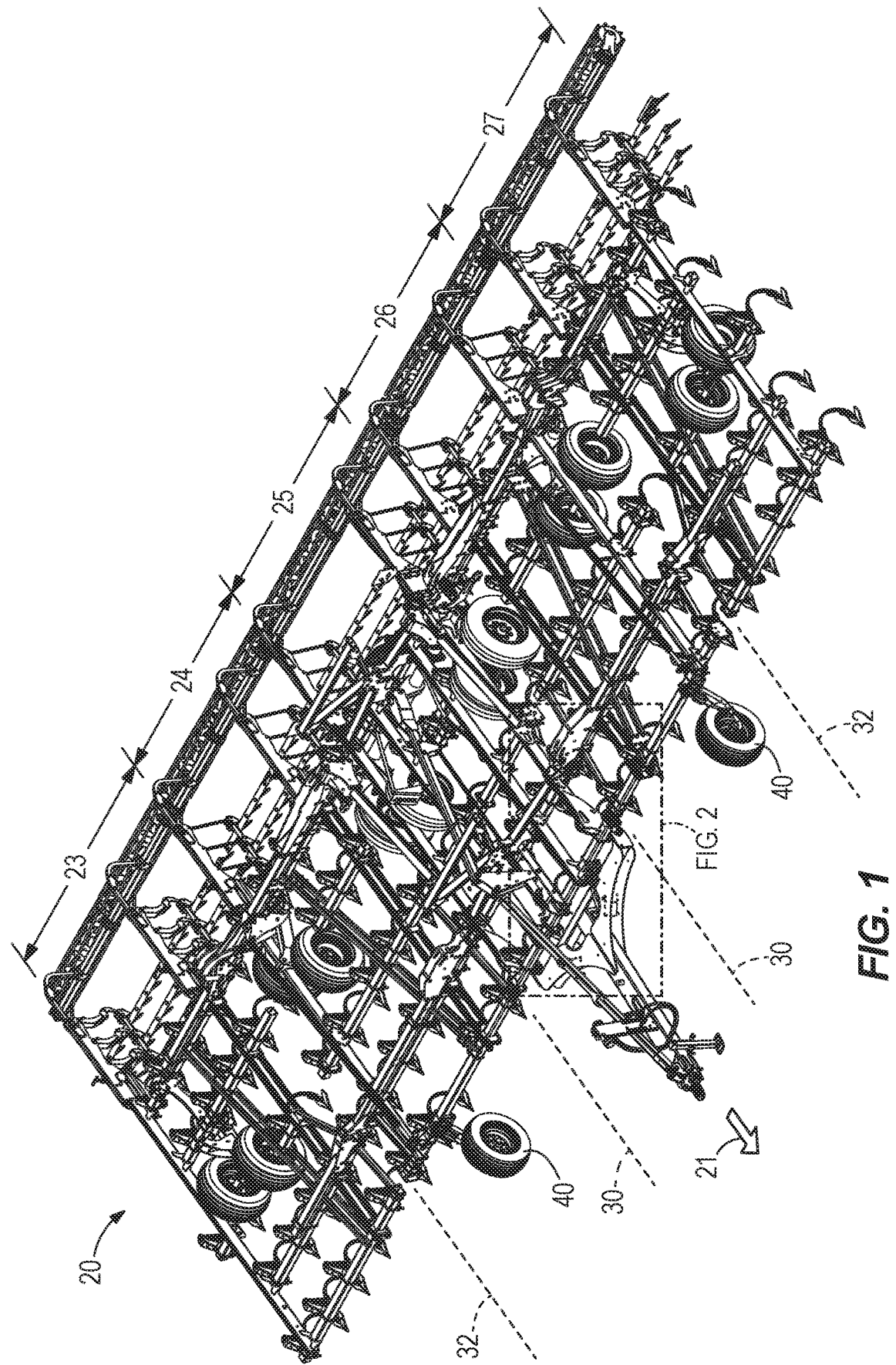
FIG. 1 is a perspective view of an example tillage implement, a cultivator containing many pivot points and hinges.

FIG. 1 shows an example tillage implement in which hinges are incorporated. The hinged tillage implement is illustrated as a multi-section, articulated field cultivator 20 with wings. Arrow 21 indicates the direction of travel of the cultivator 20. The cultivator 20 includes five frame sections, which are pivotally-hinge joined in a foldable configuration. From left to right in FIG. 1, the frame sections include: (i) a first outer wing section 23, (ii) a first inner wing section 24, (iii) a main frame section 25, (iv) a second inner wing section 26, and (v) a second outer wing section 27. The inner wing sections 24 and 26 are hinged together at opposing lateral sides of the main frame section 25 and can pivot about first and second inner hinge lines 30, respectively. The outer wing sections 23 and 27 are pivotally hinged together at the lateral outer sides of the inner wing sections 24 and 26, respectively, and can pivot about first and second outer hinge lines 32. In embodiments where the hinge lines 30 and 32 extend substantially parallel to the fore-aft axis, the hinge lines 30 and 32 may alternatively be referred to as "fore-aft hinge axes." The cultivator wing sections fold above and rotate over (pivot around) the hinge lines 30 and 32. Such a multi-section hinged design enables the cultivator 20 to transition from the unfolded operational state shown in FIG. 1 to a laterally compact, folded state to facilitate transport on roadways. The cultivator 20 is supported by a plurality of wheels 40.

Other than tillage machines, other agricultural machines include planters or sprayers that have articulated sections. For instance, sprayers have articulated air booms or fluid distribution booms. The pivoting hinge joints between the boom sections, especially the joint region between the boom and the center rack of the vehicle, encounter large shearing and rotational forces.

Figure 2:
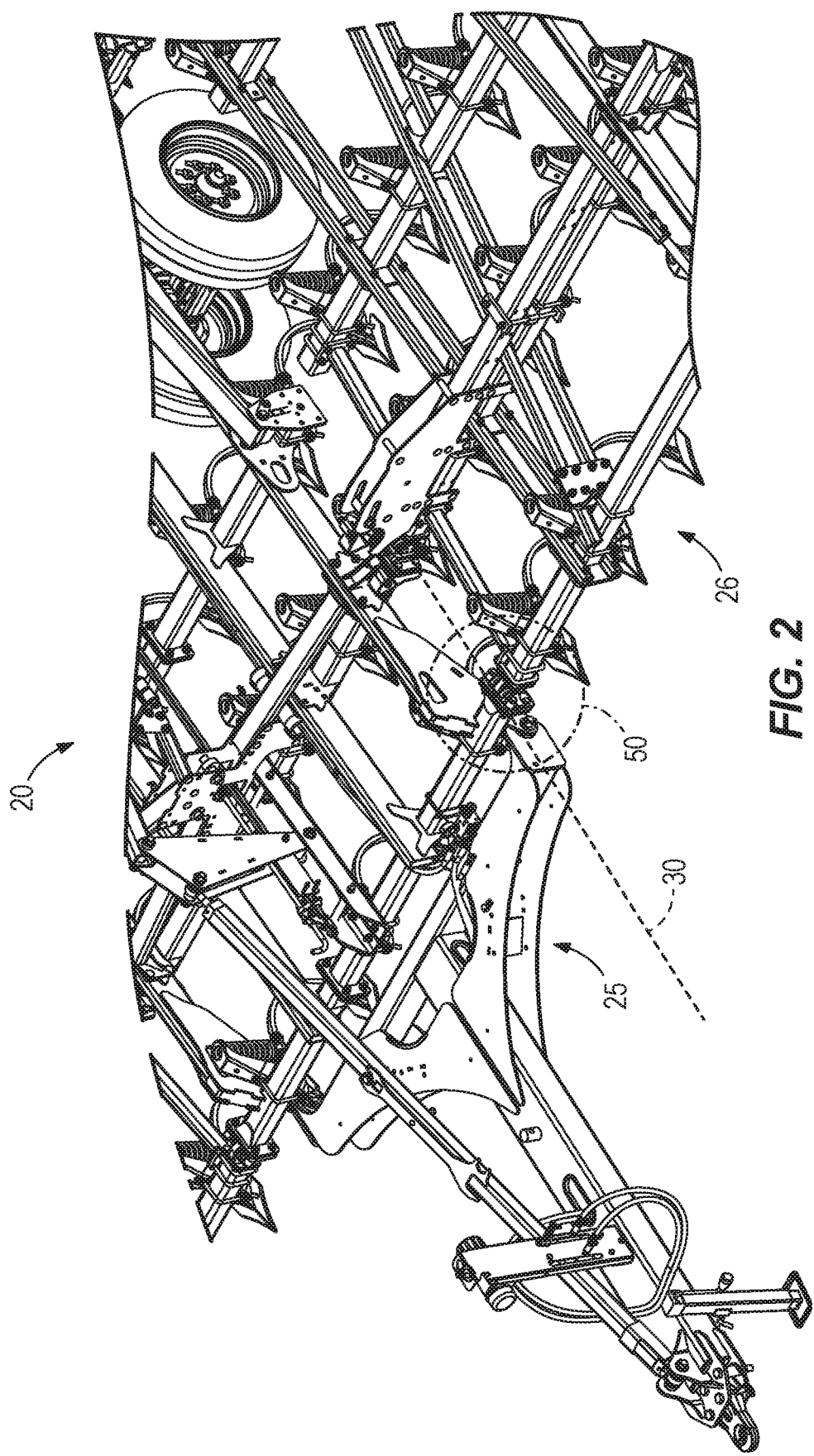
FIG. 2 is a top perspective magnified view of an example foldable section of the tillage implement of FIG. 1.

FIG. 2 depicts a top perspective magnified view of the main frame section 25 and the second inner wing section 26 of the cultivator of FIG. 1. A hinge system 50 is circled. Hinge systems 50 are located where the frame of the cultivator 20 rotates about hinge lines 30 or 32. The frame of cultivator 20 bends and folds so that a plane of the wing sections 23 and 24 can be positioned upright and perpendicular to the ground. The hinge system 50 can include jointed devices, pin joints, pivot hinges, barrel hinges, leaf hinges, butt hinges, and so on.

Figure 3:
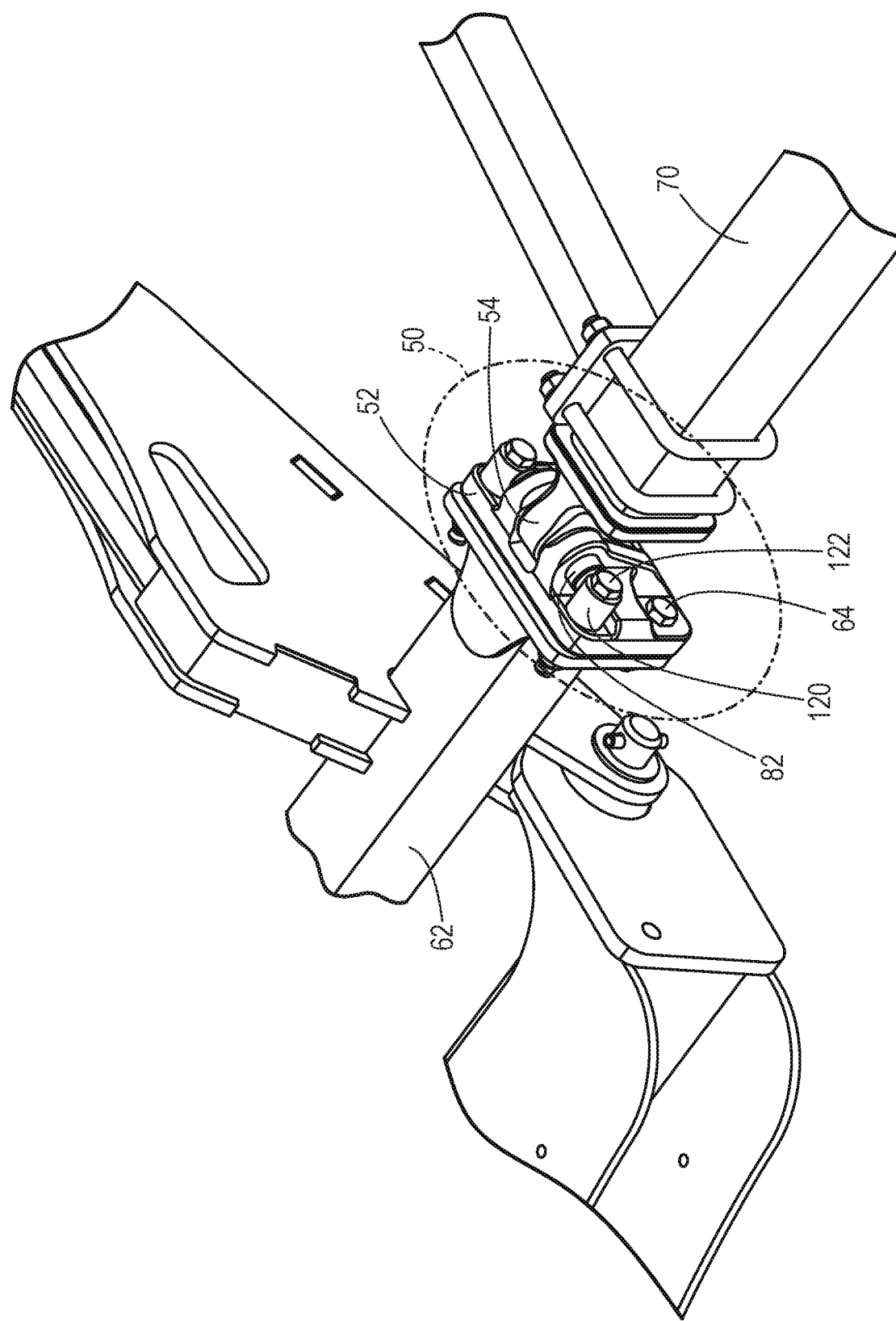
FIG. 3 is a top perspective magnified view of the circled section of FIG. 2.

FIG. 3 depicts an example embodiment of the hinge system 50 that includes a first hinge part 52 and a second hinge part 54 that mate to each other. Sometimes the first hinge part 52 is termed a receiving or female part of a hinge and the second hinge part 54 is a tongue or male part of a hinge. The illustrated hinge parts 52 and 54 are joined together by a pivot connection via a hinge pin 82. The hinge parts 52 and 54 are mounted to frame members on adjacent sections of field cultivator 20 (e.g. FIG. 1). For example, the first hinge part 52 is mounted to an end of a lateral frame member 62 in the main frame section 25 (FIG. 1), while the second hinge part 54 is mounted to an end of a lateral frame member 70 included in the second inner wing section 26. Any combination of structural features, welding, mounting hardware, and/or joinder techniques can be utilized to attach the hinge parts 52 and 54 to their respective frame members 62 and 70.

Figure 5:
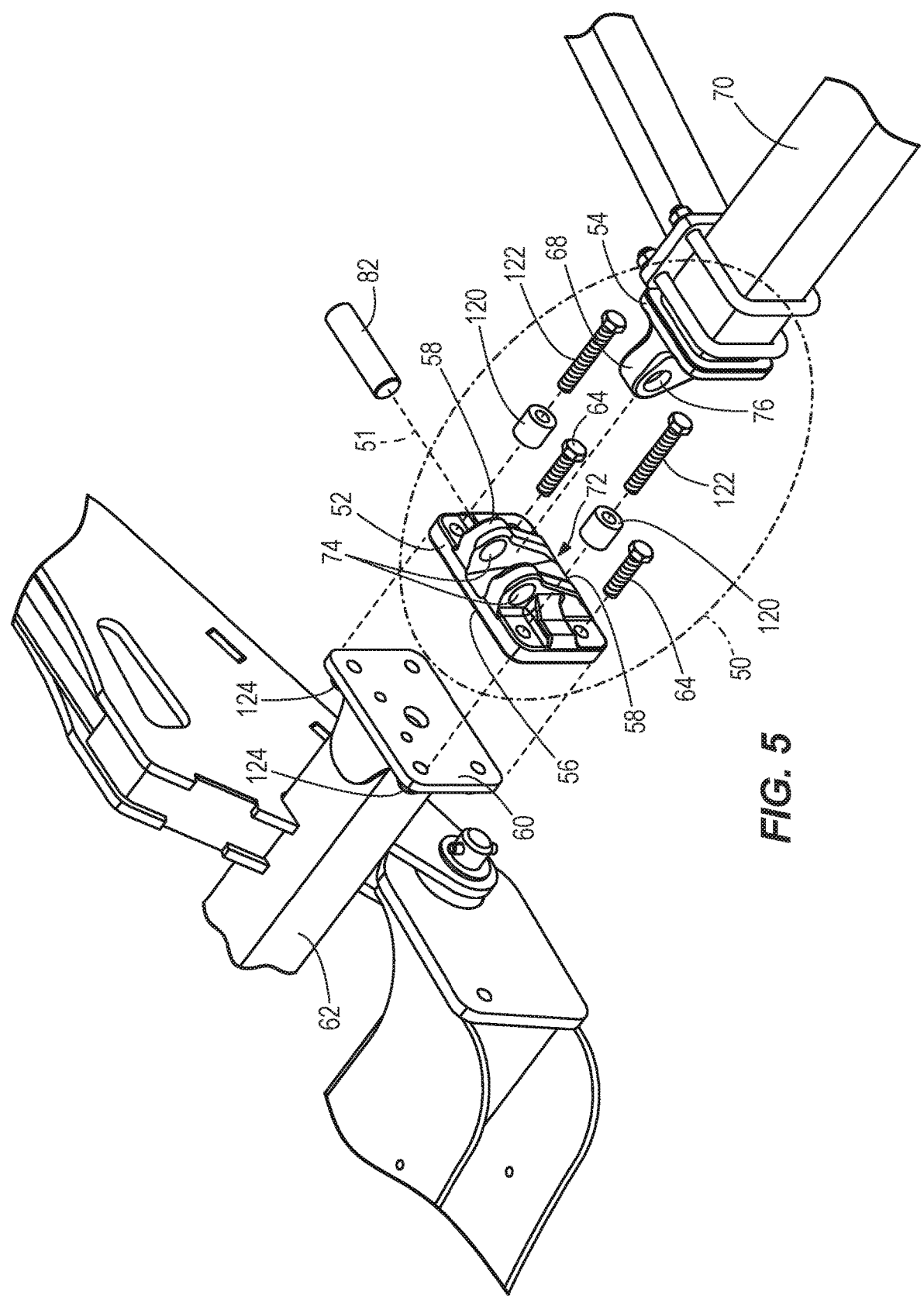
FIG. 5 is a partial exploded view of an example buttressed hinge system of FIG. 3.
Figure 6:
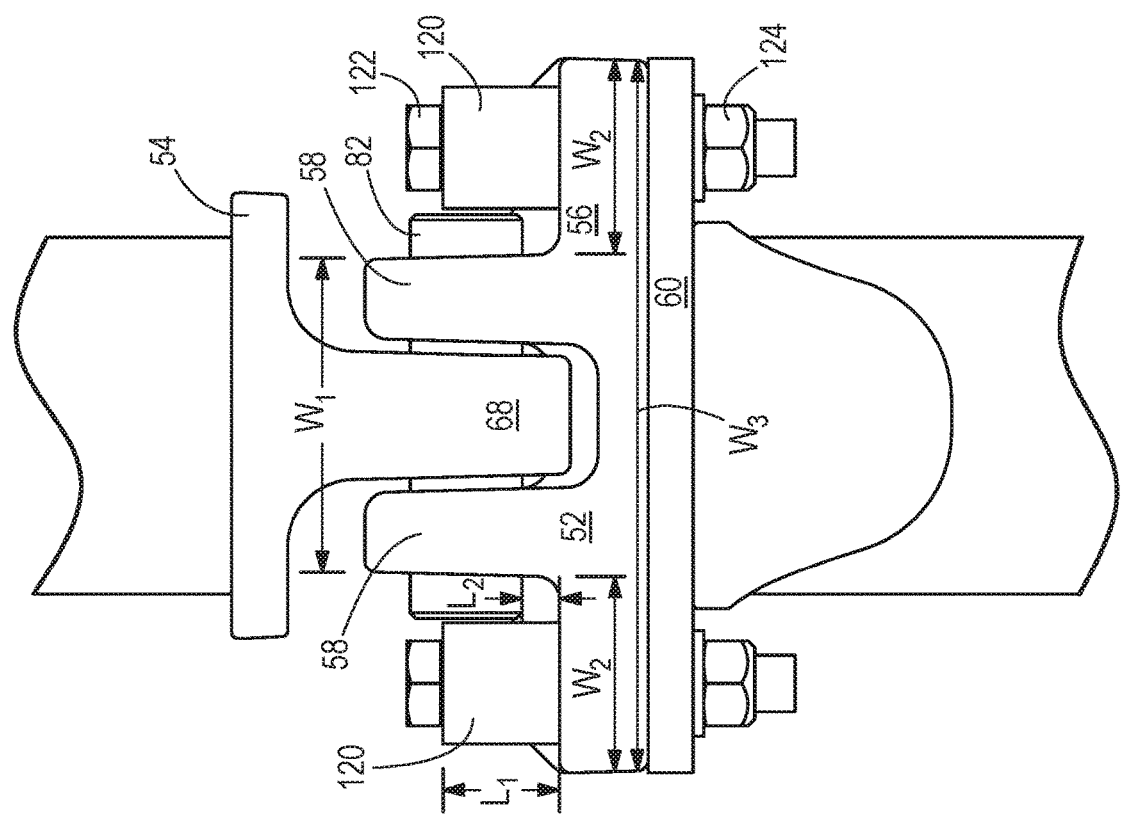
FIG. 6 is a side view of part of buttressed hinge system of FIG. 5.

With reference to FIGS. 5 and 6, the illustrated first hinge part 52 includes a hinge plate 56 and two half circular rings or clevises 58. In the illustrated embodiment, the clevises 58 are manufactured as a single piece (e.g. casting) with the hinge plate 56. The illustrated hinge plate 56 can extend out beyond an outer lateral width $W_1$ of the pair of clevises 58. The hinge illustrated hinge plate 56 extends out a distance $W_2$ on either side of the two clevises 58 of hinge part 52. The overall hinge plate width is $W_3$. In some embodiments, the hinge plate 56 is narrower than depicted in FIG. 5. For example, the width $W_3$ of hinge plate 56 can be only 5% to 10% wider than the outer lateral width $W_1$ of the pair of clevises 58. Hinge plate 56 is bolted to or mounted to a flange 60 that is attached to the rest of the frame section of the cultivator 20.

In some embodiments, the hinge parts 52 and 54 can include any number and type of mating features to form the pivotal or hinge coupling. Either or both of the hinge parts 52 and 54 can include one or more male connector features, female connector features, or combinations thereof. For example, in certain embodiments, the hinge parts 52 and 54 include a number of knuckles and fingers, respectively, which mate in an interleaved or alternating configuration to form a hinge joint. In the illustrated example, the hinge part 52 includes a pair of clevises 58 that protrude out substantially perpendicular to the mounting flange 60. The two clevises 58 are substantially parallel to each other and separated by a groove 72. The second hinge part 54 includes a male connector feature in the form of a tongue 68, which is received within the groove 72 when the hinge system 50 is assembled. When received within the groove 72, the tongue 68 can rotate relative to the first hinge part 52 about a hinge line axis 51 (see FIG. 5), which is coaxial with the rightmost fore-aft hinge line 30 shown in FIGS. 1 and 2.

In FIG. 5, openings 74 are defined by the first hinge part 52 and an opening 76 is defined by the tongue 68 of second hinge part 54. When the tongue 68 is received within the groove 72, the opening 76 aligns with corresponding openings 74 located in the clevises 58. A hinge pin 82 is inserted into aligning openings 74 and 76 to provide the hinge coupling. The hinge pin 82 has a smooth-surface cylindrical section for pivotally joining together the hinge parts 52 and 54. In some embodiments, the hinge pin 82 can include an anchor, bolt, dowel pin or flag pin.

Figure 4:
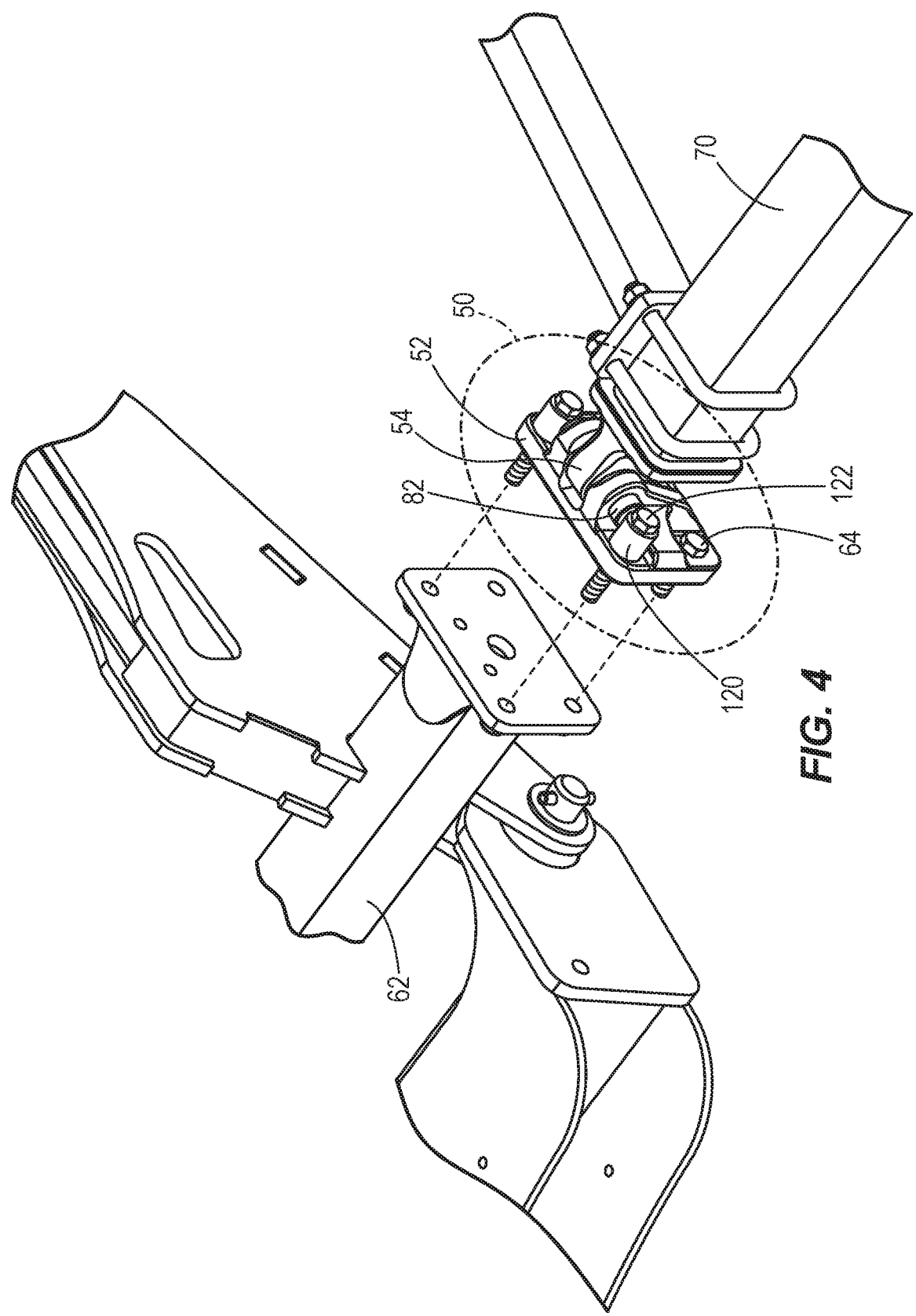
FIG. 4 is a partial exploded view of an example hinge plate region of FIG. 3.

FIGS. 3-5 illustrate bolts 64, bushings 120, bolts 122, and nuts 124 (located behind flange 60, a nut, or nut and washer, or cap nut, and so on). As shown in FIG. 6, the bushings 120 have a first length $L_1$ protruding from the hinge plate 56. The top of the hinge pin 82 is positioned a second length $L_2$ from the hinge plate 56. The first length $L_1$ is greater than $L_2$ so that the bushings 120 overlap at least a portion of the respective ends of the pin 82. The illustrated bushings 120 are substantially centered with the hinge pin 82. In the illustrated embodiment, the bushings 120 overlap a majority of the end of the hinge pin 82. In some embodiments, the bushings 120 can cover the entire ends of the hinge pin 82. The bushings 120 prevent the pin 82 from falling out of the openings 74 and 76.

In some embodiments, the bottom of bushing 120 either directly contacts the hinge plate 56 or there is an epoxy or some other adhesive between the bushing 120 and the hinge plate 56. In some embodiments, the contact surface between the hinge plate 56 and the bottom of the bushing 120 is sanded or roughened so as to increase the friction to form a better contact. The nut 124 that is screwed onto the bolt 122 can also be adhesively contacted to the flange 60. In yet other embodiments, a combination of these techniques is used to form a tighter contact or bond between the bushing 120 and the hinge plate 56.

The illustrated bushings 120 have a circular cross section with a substantially constant diameter. In other embodiments, the bushings can have a hexagonal, an octagonal or a square cross section. In some embodiments, the bushings can have a variable cross section.

Figure 7:
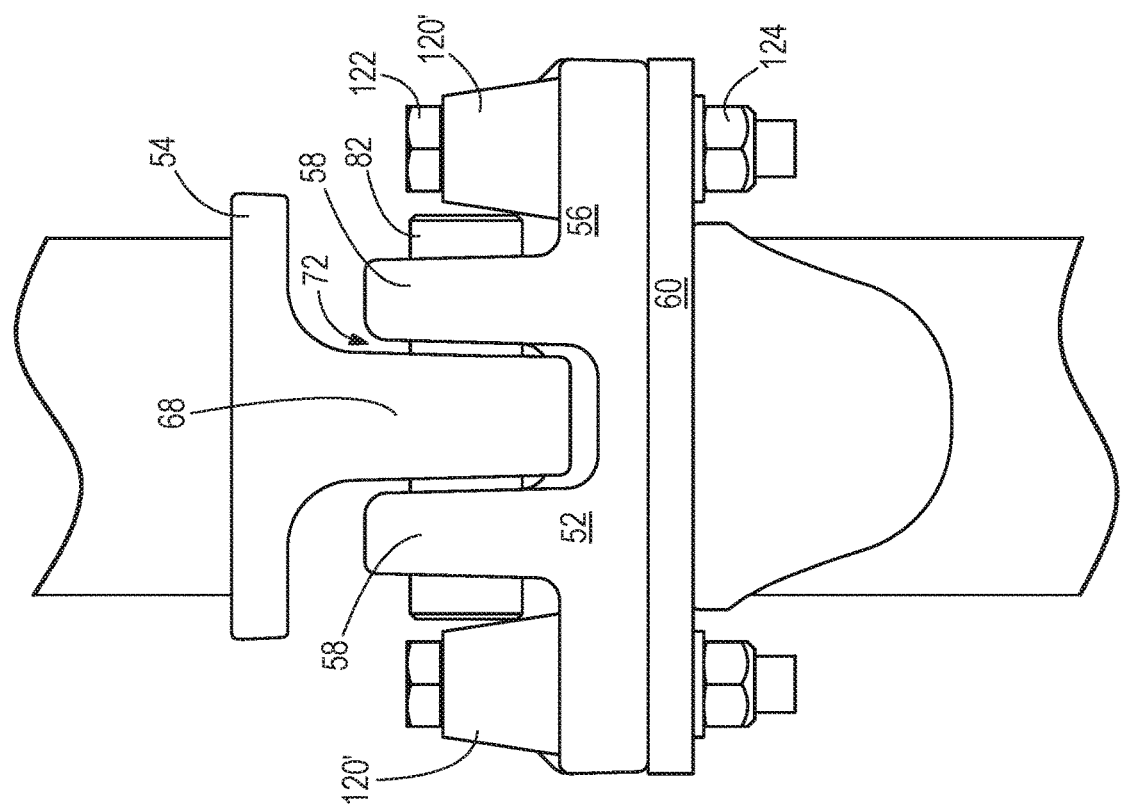
FIG. 7 is a side view of another example buttress.

FIG. 7 illustrates an alternative embodiment of a bushing 122' that is tapered in shape. The base of the bushing 120' is larger nearest the hinge plate 56. A larger base can increase the stability of the bushing 120', increasing its ability to remain stationary if the hinge pin 82 presses against the bushing 120'.

Figure 7A:
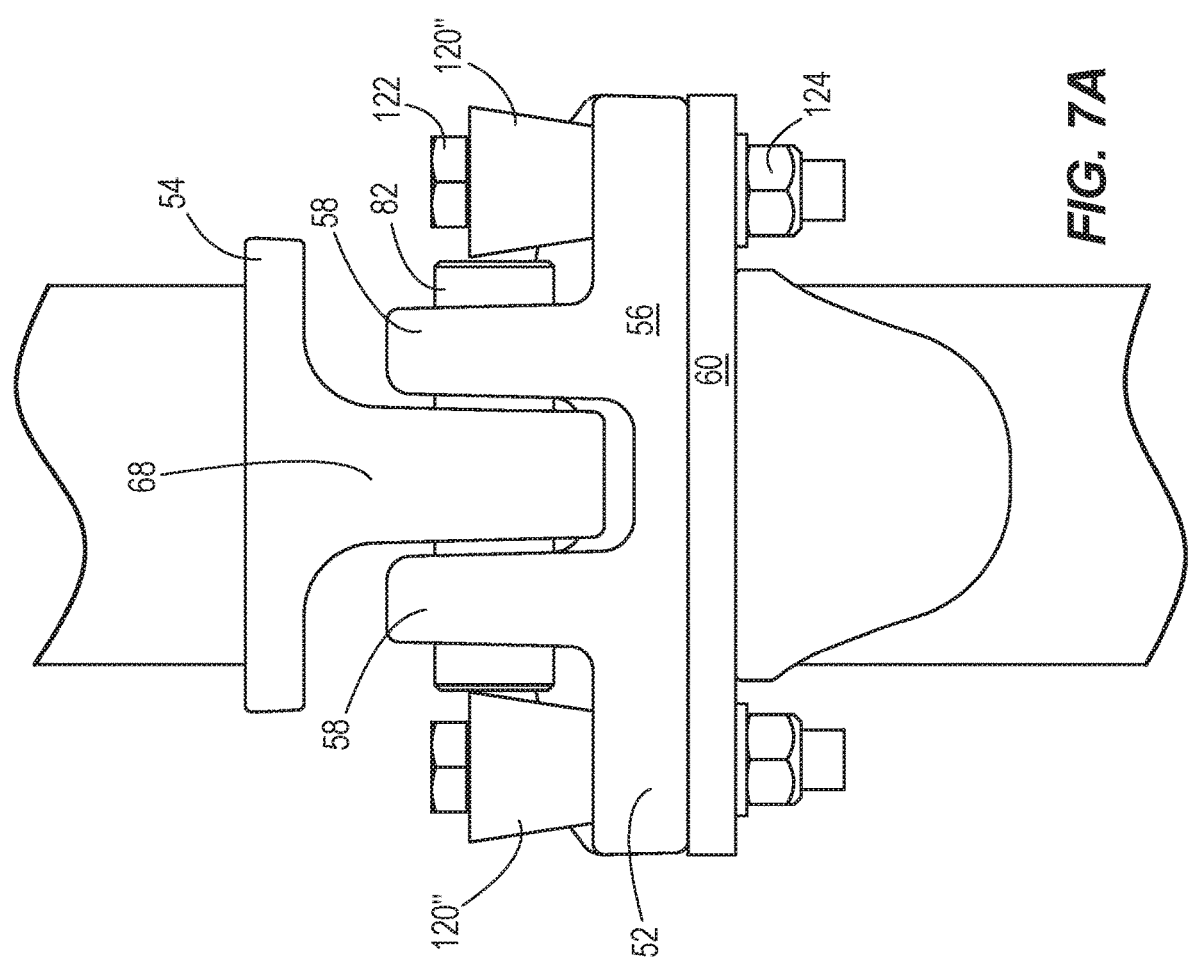
FIG. 7A is a side view of another example buttress.

Alternatively, FIG. 7A depicts another embodiment where a bushing 120" has a narrower surface area where the bushing 120" meets the hinge plate 56. A narrower surface area is useful in situations where the extended area of the hinge plate 56 is small and can only accommodate a thinner or more slender buttress. Also since the bushing 120″ widens up near the hinge pin 82, the hinge pin 82 can be abutted by the bushing 120″.

Figure 8:
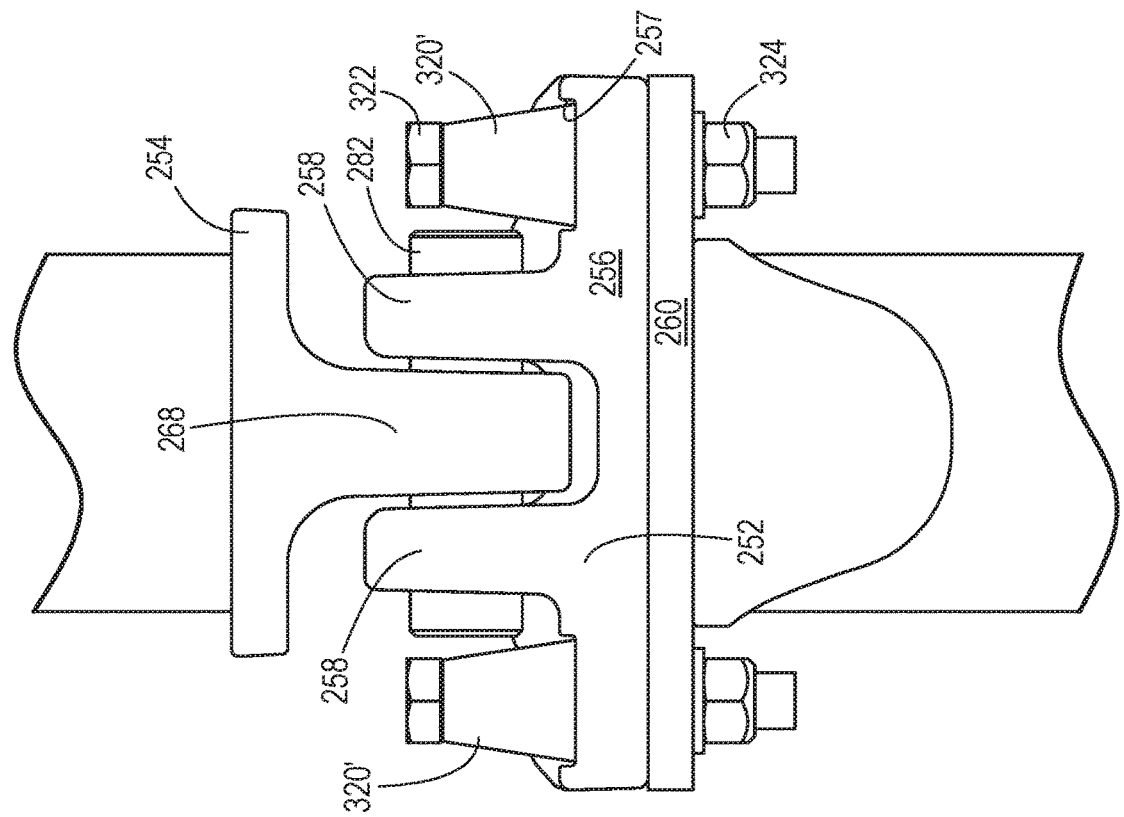
FIG. 8 is a side view of an example sunken buttress.

In some embodiments, the hinge plate can be recessed to receive at least a portion of the bushing. FIG. 8 depicts an embodiment of a hinge plate 256 including a recess 257 into which a bushing 320 fits. The recess 257 is an opening that is large enough to accommodate the base diameter of the bushing 320. The depth of the recess 257 depends on the thickness of hinge plate 256. For example, the depth may nominally be 5-10% of the thickness of hinge plate 256. But if the hinge plate 256 is thick (e.g. 1-2 inches), the depth can be increased to 10-25%. The bushing 320 is more anchored and stable when placed in the recess 257 and less likely to move than if it were located only on the surface of hinge plate 256. The remaining elements of FIG. 8 correspond to FIGS. 3-6, but are numbered in the "200" series.

Figure 9:
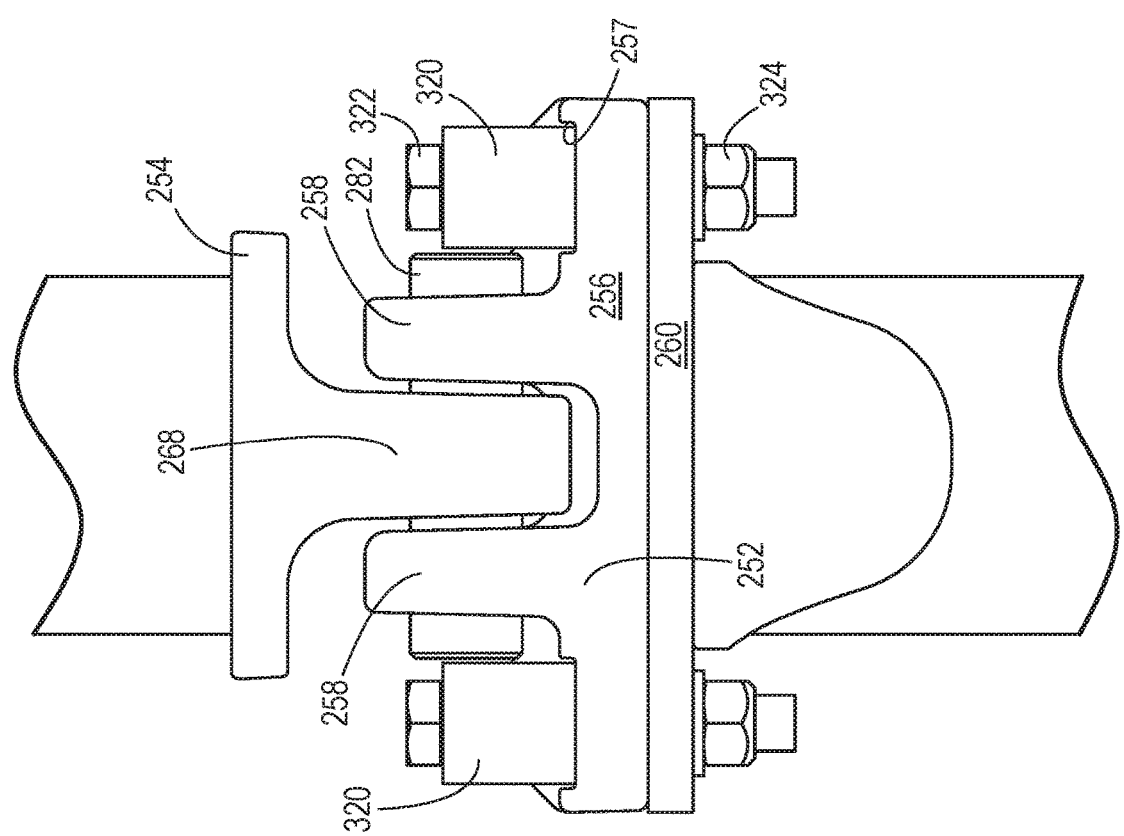
FIG. 9 is a side view of another example sunken buttress.

FIG. 9 depicts another embodiment of a hinge plate 256 including a recess 257 that receives a portion of a bushing 320′. The recess 257 is an opening that is large enough to accommodate at least the base diameter of the half-cone bushing 320′. The illustrated bushing 320′ is conical, but in other embodiments, the bushing may be a half-pyramid or have a cross section that is hexagonal, octagonal or square. The depth of recess 257 again depends on the thickness of hinge plate 256. The recess 257 can extend about 5-10% of the thickness is suitable without compromising the structural integrity of the hinge plate 256. The remaining elements of FIG. 9 correspond to FIGS. 3-6, but are numbered in the "200" series.

FIG. 9A depicts yet another embodiment of a hinge plate 456 including a recess 457 that receives a portion of a bushing 520. The recess 457 is large enough to accommodate at least the top (narrower) diameter of the half-cone bushing 520. Since the area of the bushing 520 that contacts the hinge plate 456 is now smaller, the diameter or area of the recess 457 is now also correspondingly smaller. The remaining elements of FIG. 9A correspond to FIGS. 3-6, but are numbered in the "400" series.

FIG. 9B depicts yet another embodiment a hinge plate 656 that includes a recess 657 in which a bushing 720 fits. The recess 657 has an opening that is shaped so as to key-mated (interlocked) to the shape of the base diameter of the bushing 720. The opening of recess 657 extends to the top edge of the hinge plate 656. During assembly, the larger end of the bushing 720 is first slid into the recess 657. Then the bolt 722 is inserted through the bushing 720 and the nut 724 is screwed onto the bolt 722. Since the recess 657 has a narrow collar opening 659 that is smaller in surface area than the surface area of the bottom end of bushing 720, the bushing 720 is unlikely to fall out. The depth of the recess 657 is greater than 10% (e.g. 10-40%) to prevent the bushing 720 from falling out. In the embodiment of FIG. 9B, even if the bushing 720 were not bolted down by bolt 722 and nut 724, there is decreased chance for a hinge pin 682 to fall out because the bushing 720 alone is already retained in the recess 657. The remaining elements of FIG. 9B correspond to FIGS. 3-6, but are numbered in the "600" series.

In operation, the hinge system 50 provides a pivot connection between the frame member 62 of the main frame section 25 and the frame member 70 of the second inner wing section 26. This hinged connection, along with other hinged connections included within the winged field cultivator 20, allows the second inner wing section 26 to rotate upwardly with respect to the main frame section 25 when the winged field cultivator 20 transitions from its unfolded operational to the folded transport state. The bushings 120, 120′, 120″, 320, 320′, 520 and 720 prevent the respective hinge pin 82, 282, 482 and 682 from falling out.

Many of the orientations stated in this disclosure and claims are with reference to the direction of travel of the machine (e.g. rearward is opposite the direction of travel). But, the directions, e.g. "behind" are merely illustrative and do not orient the embodiments absolutely in space. That is, a structure manufactured on its "side" or "bottom" is merely an arbitrary orientation in space that has no absolute direction. Also, in actual usage, for example, the tillage machine or construction excavator equipment may be operated or positioned at an angle because the implements may move in many directions on a hill; and then, "top" is pointing to the "side." Thus, the stated directions in this application may be arbitrary designations.

In the present disclosure, the descriptions and example embodiments should not be viewed as limiting. Rather, there are variations and modifications that may be made without departing from the scope of the appended claims. The hinge disclosed can also be utilized on other equipment, such as construction equipment or forestry equipment.

What is claimed is:

1. A hinge positioned between a first section of a machine and a second section of the machine to permit the second section to pivot with respect to the first section, the hinge comprising:
    a first portion including a first protrusion, the first protrusion defining a first aperture extending therethrough, the first portion configured to be coupled to the first section;
    a second portion including a second protrusion, the second protrusion defining a second aperture extending therethrough, the second portion configured to be coupled to the second section;
    a pin having a first end and a second end, the pin positioned to extend through the first and second apertures to pivotably couple the first portion to the second portion;
    a first fastener positioned adjacent the first end of the pin, the first fastener configured to couple the first portion to the first section and to abut the first end of the pin to thereby retain the pin in the first and second apertures, and
    a second fastener positioned adjacent the second end of the pin, the second fastener configured to couple the first portion to the first section and to abut the second end of the pin to thereby retain the pin in the first and second apertures.

2. The hinge of claim 1, wherein the first fastener comprises a first bolt, a first nut, and a first bushing, the first bushing positioned adjacent to the first end of the pin.

3. The hinge of claim 2, wherein the second fastener comprises a second bolt, a second nut, and a second bushing, the second bushing positioned adjacent to the second end of the pin.

4. The hinge of claim 3, wherein the first portion further comprises a third protrusion and a third aperture, the pin positioned to extend through the third aperture.

5. The hinge of claim 3, wherein the second portion further comprises a third protrusion and a third aperture, the pin extending through the third aperture.

6. A hinge for an agricultural machine, the machine including a center section of the agricultural machine defining a first aperture, a wheel supporting the center section, and a wing section of the agricultural machine coupled to the center section, the wing section defining a second aperture, the hinge comprising:

a pin having a first end and a second end, the pin configured to extend through the first and second apertures in order to pivotably couple the wing section to the center section;

a first fastener configured to engage one of the center section and the wing section and further configured to be positioned adjacent the first end of the pin to thereby retain the pin in the first and second apertures, and a second fastener configured to engage one of the center section and the wing section and further configured to be positioned adjacent the second end of the pin to thereby retain the pin in the first and second apertures, wherein the hinge is configured to be positioned between the center section and the wing section to permit the wing section to pivot about the center section, and wherein the first fastener comprises a first bolt, a first nut, and a first bushing, the first bushing positioned adjacent to the first end of the pin.

7. The hinge of claim 6, wherein the second fastener comprises a second bolt, a second nut, and a second bushing, the second bushing positioned adjacent to the second end of the pin.

8. The hinge of claim 7, wherein the pin is configured to extend through a third aperture of the center section.

9. The hinge of claim 7, wherein the pin is configured to extend through a third aperture in the wing section.

10. A method of retaining a pin in a hinge, the method comprising:

inserting a pin into a first aperture of a first part;
inserting the pin into a second aperture of a second part;
inserting a first fastener into the first part adjacent a first end of the pin;
abutting the first end of the pin with the first fastener;
retaining the pin in the first aperture with the first fastener;
inserting a second fastener into the first part adjacent a second end of the pin;
abutting the second end of the pin with the second fastener;
retaining the pin in the second aperture with the second fastener;
coupling the first part to a first section of an agricultural machine and coupling the second part to a second section of the agricultural machine.

11. The method of claim 10, further comprising rotating the second part with respect to the first part about the pin.

12. The method of claim 10, further comprising moving the second section of the agricultural machine with respect to the first section of the agricultural machine about the pin.

13. A method of retaining a pin in a hinge, the method comprising:

inserting a pin into a first aperture of a first part;
inserting the pin into a second aperture of a second part;
inserting a first fastener into the first part adjacent a first end of the pin;
abutting the first end of the pin with the first fastener;
retaining the pin in the first aperture with the first fastener;
inserting a second fastener into the first part adjacent a second end of the pin;
abutting the second end of the pin with the second fastener; and
retaining the pin in the second aperture with the second fastener,
wherein inserting the first fastener includes inserting a first bolt through a first bushing prior to inserting the first bolt into the first part, and further comprising abutting the first bushing against the first part with the first bolt.

14. The method of claim 13, further comprising coupling the first part to a first section of an agricultural machine and coupling the second part to a second section of the agricultural machine.

15. The method of claim 13, wherein abutting the first end of the pin with the first fastener includes abutting the first end of the pin against the first bushing.

16. The method of claim 13, wherein inserting the second fastener includes inserting a second bolt through a second bushing prior to inserting the second bolt into the first part, and further comprising abutting the second bushing against the first part with the second bolt.

17. The method of claim 16, wherein abutting the second end of the pin with the second fastener includes abutting the second end of the pin against the second bushing.

18. The method of claim 17, wherein abutting the first end of the pin with the first fastener includes abutting the first end of the pin against the first bushing.

19. The method of claim 16, further comprising coupling a first nut to the first bolt to retain the first bushing on the first part and coupling a second nut to the second bolt to retain the second bushing on the first part.

20. A hinge for a machine, the machine including a first section defining a first aperture, and a second section coupled to the first section, the second section defining a second aperture, the hinge comprising:

a pin having a first end and a second end, the pin configured to extend through the first and second apertures in order to pivotably couple the first section to the second section;

a first fastener configured to engage one of the first section and the second section and further configured to be positioned adjacent the first end of the pin to thereby retain the pin in the first and second apertures, and a second fastener configured to engage one of the first section and the second section and further configured to be positioned adjacent the second end of the pin to thereby retain the pin in the first and second apertures, wherein the hinge is configured to be positioned between the center section and the wing section to permit the wing section to pivot about the center section, and wherein the first fastener comprises a first bolt and a first bushing, the first bushing positioned adjacent to the first end of the pin.

* * * * *